US006305005B1

(12) United States Patent
Burnham

(10) Patent No.: US 6,305,005 B1
(45) Date of Patent: Oct. 16, 2001

(54) METHODS TO SECURELY CONFIGURE AN FPGA USING ENCRYPTED MACROS

(75) Inventor: James L. Burnham, Morgan Hill, CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 09/231,528

(22) Filed: Jan. 14, 1999

(51) Int. Cl.$^7$ .............................. G06F 17/50; H04L 9/00

(52) U.S. Cl. ................................ 716/16; 716/18; 713/1; 713/100; 713/202

(58) Field of Search .............................. 716/1–21; 713/1, 713/100, 202; 380/4

(56) References Cited

U.S. PATENT DOCUMENTS

| | | |
|---|---|---|
| Re. 34,363 | 8/1993 | Freeman et al. . |
| 3,849,760 | 11/1974 | Endou et al. . |
| 4,849,904 * | 7/1989 | Aipperspach et al. ................. 716/17 |
| 5,084,636 | 1/1992 | Yoneda . |
| 5,128,871 * | 7/1992 | Schmitz ................................. 716/17 |
| 5,197,016 | 3/1993 | Sugimoto et al. . |
| 5,237,218 | 8/1993 | Josephson et al. . |
| 5,237,219 | 8/1993 | Cliff . |
| 5,343,406 | 8/1994 | Freeman et al. . |
| 5,394,031 | 2/1995 | Britton et al. . |
| 5,457,408 | 10/1995 | Leung . |
| 5,574,655 | 11/1996 | Knapp et al. . |
| 5,705,938 | 1/1998 | Kean . |
| 5,909,658 * | 6/1999 | Clarke et al. ........................ 701/126 |
| 5,946,478 * | 8/1999 | Lawman ................................. 716/17 |
| 6,205,574 | 3/2001 | Dellinger et al. . |

FOREIGN PATENT DOCUMENTS

| | | |
|---|---|---|
| A0253530 | 6/1987 | (EP) . |
| WO92/20157 | 11/1992 | (WO) . |
| WO94/10754 | 11/1993 | (WO) . |
| WO94/01867 | 11/1994 | (WO) . |

OTHER PUBLICATIONS

Wong et al. ("A single–chip FPGA implementation of the data encryption standard (DES) algorithm", IEEE Global Telecommunications Conference, 1998, GLOBECOM 1998, The Bridge to Global Integration, vol. 2, pp 827–832), Nov. 1998.*

Runje et al. ("Universal strong encryption FPGA core implementation", Proceedings of Design, Automation and Test in Europe, 1998, pp. 923–924, Feb. 1998.*

Kean et al. ("DES key breaking, encryption and decryption on the XC6216", Proceedings of IEEE Symposium on FPGAs for Custom Computing Machines, 1998, pp. 310–311), Apr. 1998.*

"The Programmable Logic Data Book", published Sep., 1996, in its entirety and also specifically pp. 4–54 to 4–79 and 4–253 to 4–286, available from Xilinx, Inc., 2100 Logic Drive, San Jose, California 95124.

(List continued on next page.)

*Primary Examiner*—Matthew Smith
*Assistant Examiner*—Phallaka Kik
(74) *Attorney, Agent, or Firm*—Edward S. Mao

(57) ABSTRACT

A method is provided for securely configuring an FPGA with macros. Specifically, if an end user desires to use a macro from a macro vendor, the end user creates a design file containing an encrypted macro received from the macro vendor rather than the actual macro. The end user uses a FPGA programming tool to convert the design file into configuration data. Specifically, the FPGA programming tool processes the design file to detect encrypted macros. If an encrypted macro is detected, the FPGA programming tool requests authorization over a secured medium to decrypt the encrypted macro from the macro vendor. If authorization is received, the FPGA programming tool decrypts the encrypted macro and converts the design file into configuration data incorporating the macro.

17 Claims, 5 Drawing Sheets

OTHER PUBLICATIONS

"Core Solutions Data Book", published May, 1997, pp. 2–5 to 2–13 available from Xilinx, Inc. 2100 Logic Drive, San Jose, California 95124.

"The Programmable Logic Data Book", published 1994, available from Xilinx, Inc., 2100 Logic Drive, San Jose, California 95124, pp. 2–105 to 2–132 and 2–231 to 2–238.

D.D. Gajski, et al., "Computer Architecture" IEEE Tutorial Manual, IEEE Computer Society, 1987, pp. v–i.

"New IEEE Standard Dictionary of Electrical and Electronics Terms", Fifth Edition, 1993, p. 1011.

"IEEE Standard Test Access Port and Boundary–Scan Architecture", IEEE Std. 1149.1, published Oct. 21, 1993.

David A. Patterson and John L. Hennessy, "Computer Architecture: A Quantitive Approach", pp. 200–201, 1990.

Betty Prince, "Semiconductor Memories", copyright 1983, 1991, John Wiley & Sons, pp. 149–174.

Hodges, et al., "Analog MOS Integrated Circuits" IEEE Press, 1980, pp. 2–11.

"The Programmable Logic Data Book", published 1998, available from Xilinx, Inc., 2100 Logic Drive, San Jose, California 95124, pp. 4–46 to 4–59.

McCarley et al., "Macro–Instruction Generation for Dynamic Logic Caching", Proceedings of the 8th IEEE International Workshop on Rapid System Prototyping, Jun. 24–26, 1997, pp. 63–69.

Patriquin et al., "An Automated Design Process for the CHAMP Module", Proceedings of the IEEE 1995 National Aerospace and Electronics Conference, May 22–26, 1995, NAEC, vol. 1, pp. 417–424.

Box, "Field Programmable Gate Array Based Configurable Preprocessor", Proceedings of the IEEE 1994 National Aerospace and Electronics Conference, May 23–27, 1994, NAECON 1994, vol. 1, pp. 427–434.

Shi et al., "Macro Block Based FPGA Floorplanning", Proceedings of the Tenth International Conference on VLSI Design, Jan. 4–7, 1997, pp. 21–26.

"The Programmable Logic Data Book", published 1998, available from Xilinx, Inc., 2100 Logic Drive, San Jose, California 95124, pp. 4–46 to 4–59.

* cited by examiner

METHODS TO SECURELY CONFIGURE AN FPGA USING ENCRYPTED MACROS

CROSS-REFERENCE TO RELATED APPLICATIONS

This application relates to concurrently filed, co-pending U.S. patent application Ser. No. 09/232,022, "FPGA CUSTOMIZABLE TO ACCEPT SELECTED MACROS", by Burnham et. al., owned by the assignee of this application and incorporated herein by reference.

This application relates to concurrently filed, co-pending U.S. patent application Ser. No. 09/232,021, "METHODS TO SECURELY CONFIGURE AN FPGA TO ACCEPT SELECTED MACROS", by Lawman et. al., owned by the assignee of this application and incorporated herein by reference.

This application relates to concurrently filed, co-pending U.S. patent application Ser. No. 09/231,912, "METHODS TO SECURELY CONFIGURE AN FPGA USING MACRO MARKERS", by Burnham et al., owned by the assignee of this application and incorporated herein by reference.

This application relates to U.S. patent application Ser. No. 09/000,519, entitled "DECODER STRUCTURE AND METHOD FOR FPGA CONFIGURATION" by Gary R. Lawman, which is also incorporated herein by reference.

BACKGROUND OF THE INVENTION

1. Field of the Invention

The present invention relates to programmable devices such as field programmable gate arrays (FPGAs). More specifically, the present invention relates to methods for programming licensed software in an FPGA.

2. Discussion of Related Art

Due to advancing semiconductor processing technology, integrated circuits have greatly increased in functionality and complexity. For example, programmable devices such as field programmable gate arrays (FPGAs) and programmable logic devices (PLDs), can incorporate ever-increasing numbers of functional blocks and more flexible interconnect structures to provide greater functionality and flexibility.

FIG. 1 is a simplified schematic diagram of a conventional FPGA 110. FPGA 110 includes user logic circuits such as input/output blocks (IOBs), configurable logic blocks (CLBs), and programmable interconnect 130, which contains programmable switch matrices (PSMs). Each IOB and CLB can be configured through configuration port 120 to perform a variety of functions. Programmable interconnect 130 can be configured to provide electrical connections between the various CLBs and IOBs by configuring the PSMs and other programmable interconnection points (PIPS, not shown) through configuration port 120. Typically, the IOBs can be configured to drive output signals or to receive input signals from various pins (not shown) of FPGA 110.

FPGA 110 also includes dedicated internal logic. Dedicated internal logic performs specific functions and can only be minimally configured by a user. For example, configuration port 120 is one example of dedicated internal logic. Other examples may include dedicated clock nets (not shown), power distribution grids (not shown), and boundary scan logic (i.e. IEEE Boundary Scan Standard 1149.1, not shown).

FPGA 110 is illustrated with 16 CLBs, 16 IOBs, and 9 PSMs for clarity only. Actual FPGAs may contain thousands of CLBs, thousands of IOBs, and thousands of PSMs. The ratio of the number of CLBs, IOBs, and PSMs can also vary.

FPGA 110 also includes dedicated configuration logic circuits to program the user logic circuits. Specifically, each CLB, IOB, PSM, and PIP contains a configuration memory (not shown) which must be configured before each CLB, IOB, PSM, or PIP can perform a specified function. Typically the configuration memories within an FPGA use static random access memory (SRAM) cells. The configuration memories of FPGA 110 are connected by a configuration structure (not shown) to configuration port 120 through a configuration access port (CAP) 125. A configuration port (a set of pins used during the configuration process) provides an interface for external configuration devices to program the FPGA. The configuration memories are typically arranged in rows and columns. The columns are loaded from a frame register which is in turn sequentially loaded from one or more sequential bitstreams. (The frame register is part of the configuration structure referenced above.) In FPGA 110, configuration access port 125 is essentially a bus access point that provides access from configuration port 120 to the configuration structure of FPGA 110.

FIG. 2 illustrates a conventional method used to configure FPGA 110. Specifically, FPGA 110 is coupled to a configuration device 230 such as a serial programmable read only memory (SPROM), an electrically programmable read only memory (EPROM), or a microprocessor. Configuration port 120 receives configuration data, usually in the form of a configuration bitstream, from configuration device 230. Typically, configuration port 120 contains a set of mode pins, a clock pin and a configuration data input pin. Configuration data from configuration device 230 is transferred serially to FPGA 110 through the configuration data input pin. In some embodiments of FPGA 110, configuration port 120 comprises a set of configuration data input pins to increase the data transfer rate between configuration device 230 and FPGA 110 by transferring data in parallel. However, due to the limited number of dedicated function pins available on an FPGA, configuration port 120 usually has no more than eight configuration data input pins. Further, some FPGAs allow configuration through a boundary scan chain. Specific examples for configuring various FPGAs can be found on pages 4–46 to 4–59 of "The Programmable Logic Data Book", published in January, 1998 by Xilinx, Inc., and available from Xilinx, Inc., 2100 Logic Drive, San Jose, Calif. 95124, which pages are incorporated herein by reference. Additional methods to program FPGA's are described by Lawman in U.S. patent application Ser. No. 09/000,519, entitled "DECODER STRUCTURE AND METHOD FOR FPGA CONFIGURATION" by Gary R. Lawman, which is referenced above.

As explained above, actual FPGAs can have thousands of CLBs, IOBs, PSMs, and PIPs; therefore, the design and development of FPGA software is very time-consuming and expensive. Consequently, many vendors provide macros for various functions that can be incorporated by an end user of the FPGA into the user's own design file. For example, Xilinx, Inc. provides a PCI interface macro, which can be incorporated by an end user into the user's design file. The user benefits from the macro because the user does not need to spend the time or resources to develop the macro. Further, since the vendor profits from selling the same macro to many users, the vendor can spend the time and resources to design optimized macros. For example, the vendor strives to provide macros having high performance, flexibility, and low gate count. However, the macro vendors are reluctant to give out copies of the macros without a way of insuring that the macros are used only by licensed users. Hence, there is a need for a method or structure to insure third party macros are used only by licensed end users.

SUMMARY

The present invention uses encrypted macros in design files to insure only licensed users can use specific macros in FPGAs. Specifically, an end user creates a design file by incorporating an encrypted macro in the end user's FPGA design file instead of the actual source code for the macro. The end user uses an FPGA programming tool that is configured to request authorization from the macro vendor or a license manager to decrypt the encrypted macro. If authorization is received, the FPGA programming tool converts the design file into configuration data, which incorporates the macro.

The macro vendor only provides encrypted macros to the end user. The encrypted macros cannot be used in an FPGA unless the FPGA programming tool obtains authorization to decrypt the encrypted macro. To obtain authorization, the FPGA programming tool contacts the macro vendor over a secure medium such as a telephone line or a secure channel of a network. In one embodiment, the macro vendor supplies a decryption key that is needed to decrypt the encrypted macro over the secured medium to the FPGA programming tool. Furthermore, in some embodiments, the end user must provide a unique and confidential user identification to the FPGA programming tool. The user identification is provided to the macro vendor when the FPGA programming tool requests authorization to decrypt the encrypted macro. Thus, the macro vendor can determine whether the end user is licensed to use the encrypted macro. Moreover, the end user can include several encrypted macros in a single design file. The FPGA programming tool is configured to detect the various encrypted macros and to contact the appropriate macro vendor to obtain authorization for each encrypted macro. The present invention will be more fully understood in view of the following description and drawings.

DETAILED DESCRIPTION

Figure 1:
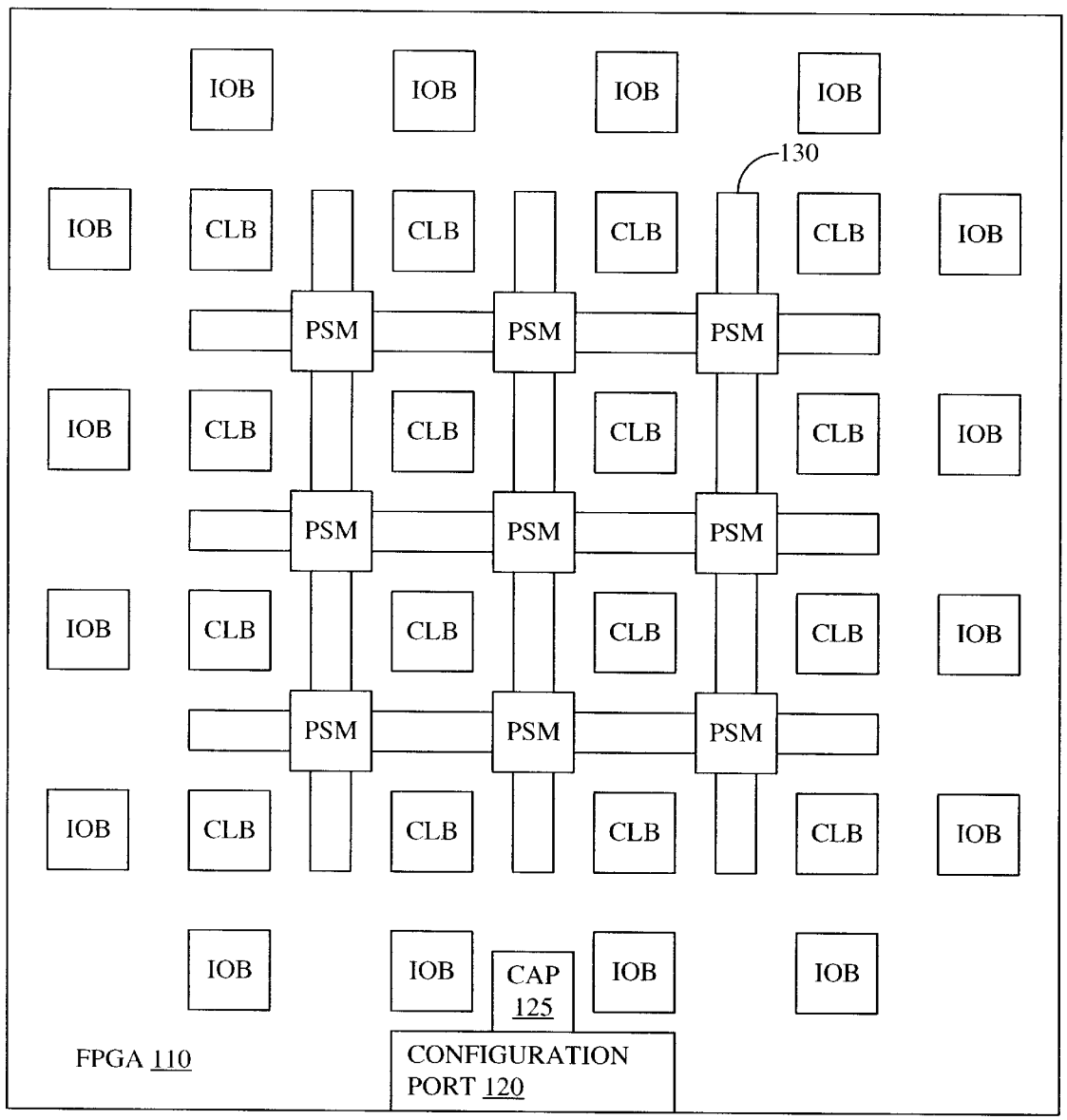
FIG. 1 is a simplified schematic diagram of a conventional FPGA.
Figure 2:
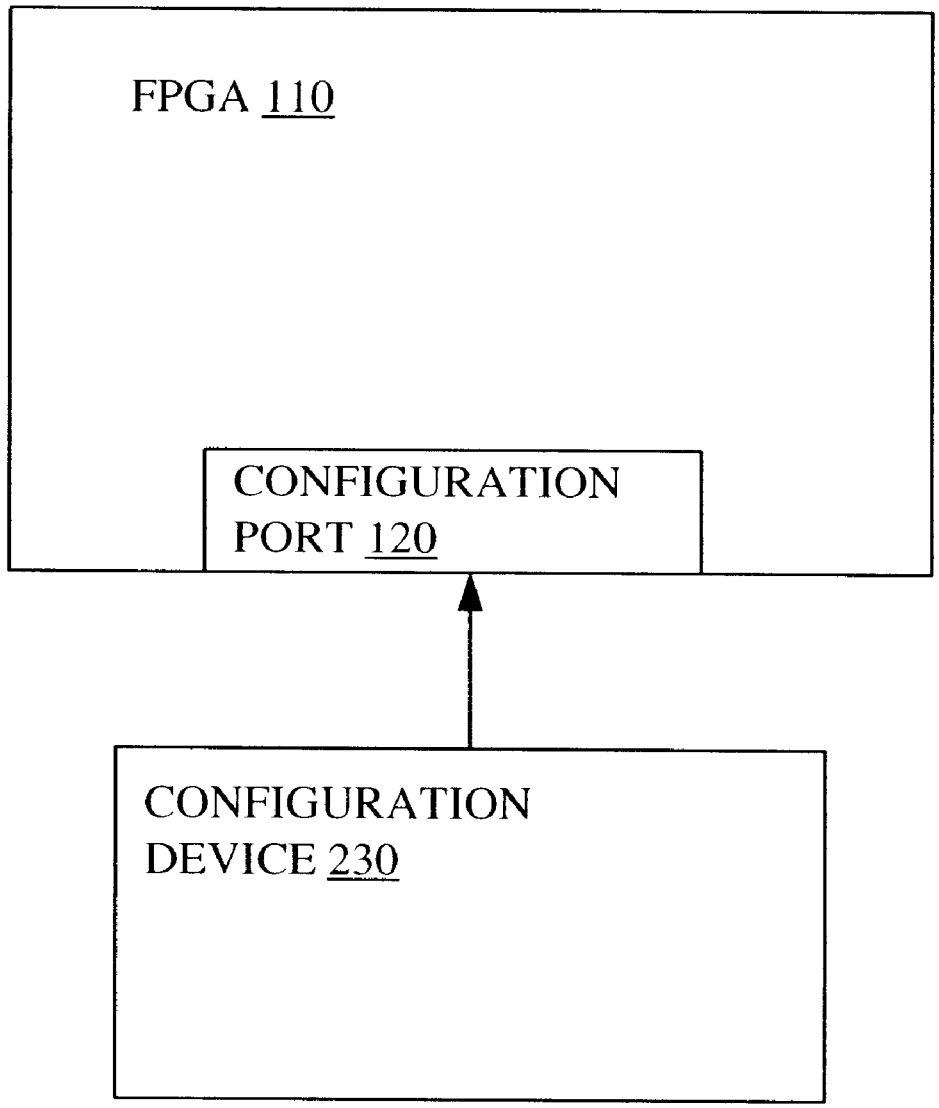
FIG. 2 is a prior art schematic diagram of an FPGA configured with a configuration device.
Figure 3:
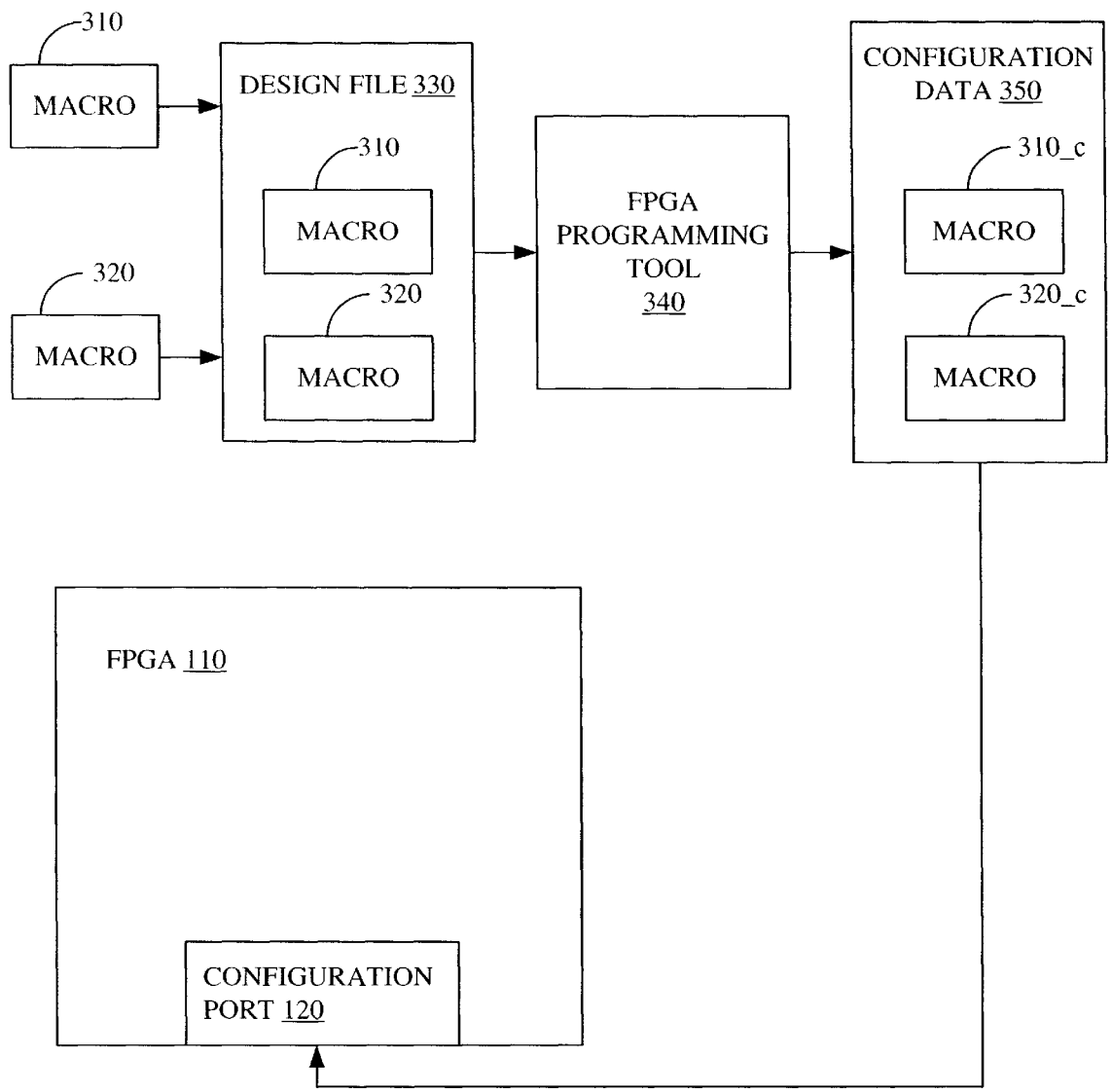
FIG. 3 illustrates a prior art method of programming an FPGA using macros.

FIG. 3 illustrates a conventional manner of configuring an FPGA using macros. In FIG. 3, an end user (not shown) desires to program FPGA 110 with a macro 310 and a macro 320. Typically, the end user creates a design file 330, which includes macro 310 and macro 320. Design file 330 is converted into configuration data 350 by an FPGA programming tool 340. Configuration data 350 contains macro 310_c, which is the converted version of macro 310, and macro 320_c, which is the converted version of macro 320. The converted versions of the macros typically take the form of portions of a configuration bitstream. Configuration data 350 also typically takes the form of a configuration bitstream. Configuration data 350 is typically stored in a configuration device such as configuration device 230 (FIG. 2). Configuration data 350 is sent into FPGA 110 through configuration port 120 to configure FPGA 110. As stated above, the macro vendors providing macros 310 and 320 may not wish to make macro 310 and macro 320 easily available due to fear of unlicensed use.

Figure 4:
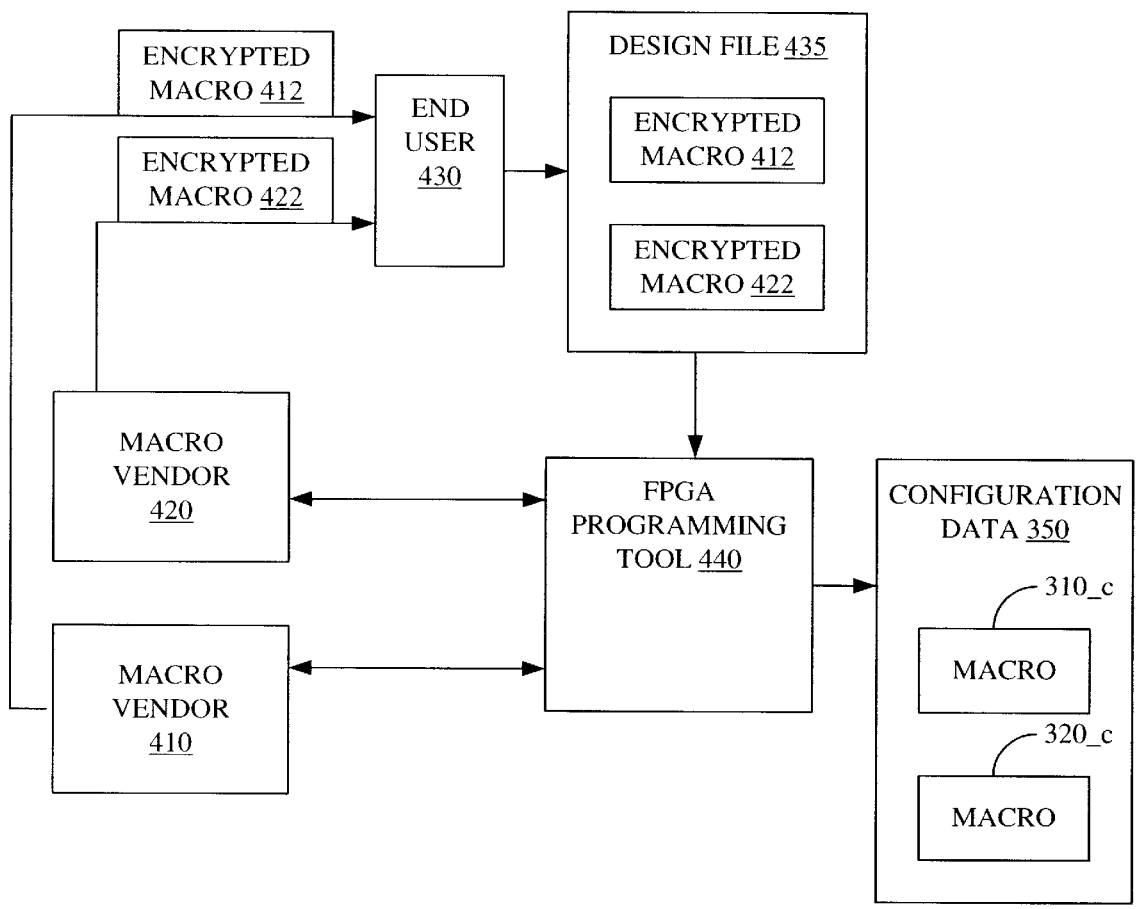
FIG. 4 illustrates a method of programming an FPGA in accordance with one embodiment of the present invention.

FIG. 4 illustrates a method to program macros into FPGAs without fear of piracy in accordance with one embodiment of the present invention. In FIG. 4, an end user 430 wishes to configure an FPGA using macro 310 from macro vendor 410 and macro 320 from a macro vendor 420. Instead of providing a copy of macro 310 to end user 430, macro vendor 410 provides an encrypted macro 412 to end user 430. Similarly, macro vendor 420 provides a encrypted macro 422 to end user 430 instead of providing macro 320. The specific encryption schemes used for encrypted macros 412 and 422 are not an integral part of the present invention. In one embodiment of the present invention, encrypted macros 412 and 422 are Java™ archive files. ("Java" is a trademark of Sun Microsystems, Inc.)

Encrypted macro 412 contains information regarding macro 310 that can be used by end user 430 to create and test a design file incorporating macro 310. Specifically, encrypted macro 412 contains information regarding the FPGA resources (e.g., CLBs, IOBs, PSMs) required by macro 310. Furthermore, encrypted macro 412 may contain information regarding how circuits designed by end user 430 can interface to the circuits defined by macro 310. In some embodiments, encrypted macro 412 also contains information for simulating the circuits defined by macro 310 so that end user 430 can simulate the design file containing encrypted macro 412. Encrypted macro 422 may contain similar information regarding macro 320.

End user 430 creates a design file 435 containing encrypted macro 412 and encrypted macro 422. End user 430 then uses an FPGA programming tool 440 to convert design file 435 into configuration data 350, which contains macro 310_c and macro 320_c as described above. During the conversion of design file 435 into configuration data 350, FPGA programming tool 440 processes design file 435 to locate encrypted macros. When an encrypted macro is detected, FPGA programming tool 440 contacts the macro vendor that created the encrypted macro over a secure medium, such as a telephone line or a secured channel of a public network, to obtain authorization to decrypt the encrypted macro. In one embodiment, FPGA programming tool 440 is a Java applet, which communicates with macro vendors using encrypted channels over the internet.

In the example of FIG. 4, FPGA programming tool 440 contacts macro vendor 420 to obtain authorization to decrypt encrypted macro 422. Similarly, FPGA programming tool 440 contacts macro vendor 410 to obtain authorization to decrypt encrypted macro 412. In some embodiments, the macro vendors provide a decryption key to FPGA programming tool 440 for decrypting the encrypted macro. FPGA programming tool 440 is configured so that the decrypted macro is not revealed to end user 430. In one embodiment, FPGA programming tool 440 is configured to program exactly one FPGA or exactly one configuration device each time authorization is given to decrypt a macro.

Each end user (or the company employing the end user) has a unique and confidential password to identify the end user. When FPGA programming tool 440 requests authorization for encrypted macro 412 from macro vendor 410, FPGA programming tool 440 transmits the password of end user 430 to macro vendor 410. Thus, macro vendor 410 is provided with the identity of the end user requesting use of encrypted macro 412. Thus, macro vendor 410 can determine whether the request to decrypt encrypted macro 412 comes from a licensed end user. Furthermore, macro vendor 410 can track how often encrypted macro 412 is used. Similarly, macro vendor 420 is able track the use of encrypted macro 422. Thus, encrypted macros 412 and 422 can be freely distributed with only minimal risk of unauthorized use.

Figure 5:
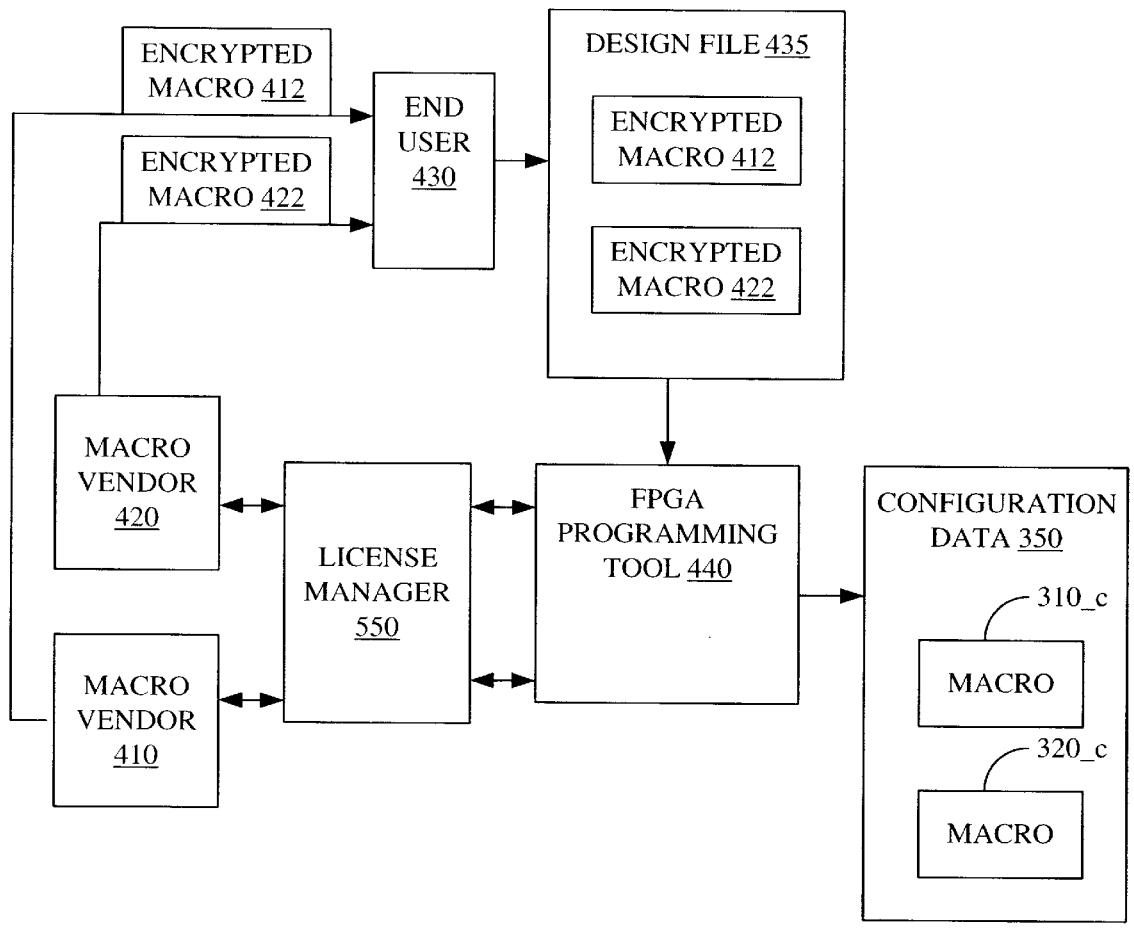
FIG. 5 illustrates a method of programming an FPGA in accordance with one embodiment of the present invention.

FIG. 5 illustrates a method to program macros into FPGAs without fear of piracy in accordance with another embodiment of the present invention. Since the method of FIG. 5 is similar to the method of FIG. 4, only the differences between the methods are described. Specifically, for the method of FIG. 5, FPGA programming tool 440 contacts a license manager 550 rather than macro vendors 410 and 420. License manager 550 provides authorization for FPGA programming tool 440 to decrypt encrypted macros 422 and 412. License manager 550 manages the authorization of encrypted macros for a variety of macro vendors, such as macro vendors 410 and 420. Thus, each end user pays licensing fees to and requests passwords from license manager 550 to use the encrypted macros. License manager 550 distributes the licensing fees to the appropriate macro vendors. Thus, encrypted macros 412 and 422 can be freely distributed with only minimal risk of unauthorized use.

In the various embodiments of this invention, methods and structures have been described to securely distribute and use third party macros. Only encrypted versions of the macros are released to end users. To use the encrypted macros an end user must receive authorization or a decryption key from the macro vendor to convert a design file using the encrypted macro into configuration data. Thus, the possibility of unlicensed use of the macro is diminished. By providing a secure method to distribute macros, macro vendors are motivated to expend the time and effort to create large libraries of optimized macros to sell to end users. Thus, the cost and time for creating design files for FPGAs by an end user can be reduced through the use of macros from macro vendors.

The various embodiments of the structures and methods of this invention that are described above are illustrative only of the principles of this invention and are not intended to limit the scope of the invention to the particular embodiments described. For example, in view of this disclosure, those skilled in the art can define other design files, encrypted macros, macros, encryption algorithms, configuration devices, programming tools, FPGAs, CLBs, IOBs, PSMs, configuration access ports, configuration ports, and so forth, and use these alternative features to create a method, circuit, or system according to the principles of this invention. Thus, the invention is limited only by the following claims.

What is claimed is:

1. A method to program an FPGA comprising the steps of:
creating a design file incorporating a first encrypted macro of a first macro;
obtaining authorization to decrypt said first encrypted macro;
decrypting the first encrypted macro to obtain the first macro; and
converting said design file and said first macro into configuration data, wherein said configuration data incorporates a first converted macro based on said first macro.

2. The method of claim 1, further comprising the step of obtaining said first encrypted macro from a first macro vendor.

3. The method of claim 1, wherein said step of obtaining authorization to decrypt said first encrypted macro further comprises the step of obtaining a first decryption key for said first encrypted macro.

4. The method of claim 3, wherein said authorization is obtained over a telephone line.

5. The method of claim 3, wherein said authorization is obtained over a secured channel of a network.

6. The method of claim 1, further comprising the step of programming said FPGA with said configuration data.

7. The method of claim 1, further comprising the step of incorporating a second encrypted macro of a second macro in said design file.

8. The method of claim 7, wherein said configuration data incorporates a second converted macro based on said second macro.

9. The method of claim 7, further comprising the step of obtaining authorization to decrypt said second encrypted macro.

10. The method of claim 9, further comprising the step of obtaining said second encrypted macro from a second macro vendor.

11. The method of claim 1, wherein said first encrypted macro is a Java archive file.

12. The method of claim 1, further comprising the step of providing a confidential password for obtaining authorization to decrypt said first encrypted macro.

13. A method to securely provide macros for programming an FPGA, said method comprising the steps of:
encrypting a first macro to form a first encrypted macro;
providing said first encrypted macro to an end user;
granting authorization to decrypt said first encrypted macro over a secured medium; and
converting the first macro into a first converted macro.

14. The method of claim 13, further comprising the step of providing a first decryption key to decrypt said first encrypted macro over said secured medium.

15. The method of claim 13, wherein said secured medium is a telephone line.

16. The method of claim 13, wherein said secured medium is a secured channel of a network.

17. The method of claim 13, further comprising the steps of:
encrypting a second macro to form a second encrypted macro;
providing said second encrypted macro to an end user; and
granting authorization to decrypt said second encrypted macro over said secured medium.

* * * * *